US008031697B2

(12) United States Patent
Krishnamurthy et al.

(10) Patent No.: US 8,031,697 B2
(45) Date of Patent: Oct. 4, 2011

(54) METHOD FOR BEARER INDEPENDENT CALL CONTROL (BICC) OPTIMIZATION FOR IP BEARER SUPPORT

(75) Inventors: Anand Yadalam Krishnamurthy, Bangalore (IN); Umanath Lanka, Bangalore (IN); Narayana Murthy, Bangalore (IN); Wasi Asghar, Bangalore (IN)

(73) Assignee: Samsung Electronics Co., Ltd (KR)

( * ) Notice: Subject to any disclaimer, the term of this patent is extended or adjusted under 35 U.S.C. 154(b) by 988 days.

(21) Appl. No.: 11/813,176

(22) PCT Filed: Dec. 29, 2005

(86) PCT No.: PCT/KR2005/004646
§ 371 (c)(1),
(2), (4) Date: Nov. 19, 2007

(87) PCT Pub. No.: WO2006/071092
PCT Pub. Date: Jul. 6, 2006

(65) Prior Publication Data
US 2008/0219225 A1    Sep. 11, 2008

(30) Foreign Application Priority Data
Dec. 31, 2004    (IN) .............................. 1494/CHE/2004

(51) Int. Cl.
*H04L 12/66* (2006.01)

(52) U.S. Cl. ........................................ 370/352; 370/338
(58) Field of Classification Search .................. None
See application file for complete search history.

(56) References Cited

U.S. PATENT DOCUMENTS

| 6,563,813 | B1 * | 5/2003 | Coveley .......................... 370/349 |
| 7,031,703 | B1 * | 4/2006 | Graf et al. .................... 455/432.1 |
| 7,079,519 | B2 * | 7/2006 | Lee et al. ........................ 370/338 |
| 7,535,889 | B2 * | 5/2009 | Ejzak et al. .................... 370/352 |
| 7,586,857 | B2 * | 9/2009 | Ejzak et al. .................... 370/260 |
| 7,751,359 | B1 * | 7/2010 | Bienn et al. .................... 370/328 |
| 7,898,990 | B2 * | 3/2011 | Kallio et al. .................... 370/261 |
| 2002/0080797 | A1 | 6/2002 | Kim |
| 2003/0118009 | A1 | 6/2003 | Hoffmann |
| 2003/0169768 | A1 * | 9/2003 | Bienn et al. .................... 370/469 |
| 2003/0231623 | A1 | 12/2003 | Ryu et al. |
| 2004/0010609 | A1 * | 1/2004 | Vilander et al. ............... 709/230 |
| 2005/0181782 | A1 * | 8/2005 | Hollis et al. ................... 455/424 |
| 2006/0133352 | A1 * | 6/2006 | Chang ............................ 370/352 |
| 2006/0251050 | A1 * | 11/2006 | Karlsson ........................ 370/352 |
| 2006/0294245 | A1 * | 12/2006 | Raguparan et al. ........... 709/227 |
| 2008/0031229 | A1 * | 2/2008 | Michelson et al. ........... 370/352 |

FOREIGN PATENT DOCUMENTS

| WO | WO 99/55095 | 10/1999 |
| WO | WO 2004/030380 | 4/2004 |

* cited by examiner

*Primary Examiner* — Phirin Sam
(74) *Attorney, Agent, or Firm* — The Farrell Law Firm, P.C.

(57) ABSTRACT

A method is disclosed for the optimization of a BICC (Bearer Independent Call Control) IP Bearer Support in a WCDMA R4 Telecommunication system, and provides for exchange of IP Address and Port Id between two MGWs by avoiding tunneling between two MSCs, reducing the number of message exchanges, and reducing the message sizes.

14 Claims, 4 Drawing Sheets

METHOD FOR BEARER INDEPENDENT CALL CONTROL (BICC) OPTIMIZATION FOR IP BEARER SUPPORT

PRIORITY

This application is a national stage application of an international application filed in the Korean Intellectual Property Office on Dec. 29, 2005 and assigned PCT Serial No. PCT/KR2005/004646, which claims priority to an application filed with the Indian Patent Office on Dec. 31, 2004 and assigned Serial No. 1494/CHE/2004, the contents of which are incorporated herein by reference.

FIELD OF THE INVENTION

The present invention in general relates to the telecommunication technology. More particularly, the present invention relates to the optimization of the BICC (Bearer Independent Call Control) IP (Internet Protocol) bearer support in a Wideband Code Division Multiple Access (WCDMA) R4 Telecommunication system.

DESCRIPTION OF THE RELATED ART

IP networks are fundamentally different from connection-oriented networks such as those based on Time Division Multiplexing (TDM) or Asynchronous Transfer Mode (ATM), in that signaling messages do not need to be acted upon by all the network elements for user plane communication to take place. If the gateways or inter-working points can exchange information, then the IP network can route the user plane packets between the gateways. The exchange of information is simple and consists of IP address, port numbers and some information on the type of media required.

In IP networks utilizing Session Internet Protocol (SIP) as the call control protocol, the information concerning the media is defined in the Session Description Protocol (SDP). SDP specifies the definition of the data format and its meaning.

For the Universal Mobile Telecommunications System (UMTS) core network, ATM is used in the transport network user plane and the transport network control plane with BICC as the call control protocol on the Nb interface. As BICC call control procedures are independent of the bearer technology, these protocols can also be used over the IP networks.

IP Bearer Control Protocol (IPBCP) is suitable for use in IP network environments where the BICC is deployed. The purpose of IPBCP is to exchange information between the two Bearer Inter-Working Functions (BIWFs). BICC IPBCP is used for the exchange of media stream characteristics, port numbers and IP addresses of the source and sink of media stream to establish and allow the modification of IP bearers. The exchange of information with IPBCP is done during the BICC call establishment and after a call has been established. IPBCP uses the SDP to encode this information.

The IPBCP makes use of the BICC Bearer Control Tunneling Protocol (BCTP) which provides a tunneling mechanism over the "horizontal" BICC interface between CCUs and the "vertical" CBC interface between CCU and the BCU. The tunneling will be described using a forward bearer delayed tunneling technique.

The Mobile Switching Center (MSC)-A ("Originating Mobile Switching Center") initiates bearer establishment procedure by sending a BICC Initial Address Message (IAM) message with Backbone Network Connection (BNC) characteristics set to IP/Real-time Transport Protocol (RTP) indicating that an IP bearer needs to be established, codec list indicating that codec negotiation is required, the tunneling indicator set to the tunneling to be used, and no tunnel data indicating that bearer establishment type is delayed tunneling.

The MSC-B ("Terminating Mobile Switching Center"), after processing the IAM, performs a Prepare Bearer procedure by sending an AddRequest message to Media GateWay (MGW)-B ("Terminating Media Gateway"). The AddRequest message contains the selected codec for bearer establishment. The BNC characteristics set to IP/RTP and the tunneling option set to delayed tunneling indicate that the MGW needs to wait for the IPBCTP Request message.

The MGW-B responds with an AddReply message that contains the BIWF Address and Backbone Network Connection Identification (BNCId).

The MSC-B indicates to the MSC-A the selected codec for the bearer establishment, the tunneling indicator that is set to the tunneling used, the BIWF Address and the BNCId through the BICC Application transPort Mechanism (APM) message.

The MSC-A then performs the Establish Bearer procedure by sending the AddRequest message containing the codec type that needs to be used for the bearer establishment and the set tunneling option.

The MGW-A ("Originating Media Gateway") responds with the AddReply message. The MSC-A waits for the tunnel data.

The MGW-A sends a NotifyMessage with the IPBCTP Request message containing the MGW's IPAddress and Port Identification (PortId) information.

The MSC-A responds with a NotifyReply confirming the receipt of the tunnel data.

The MSC-A now responds to the MSC-B the IPBCTP Request message as the tunnel data through the BICC APM message.

The MSC-B sends a ModifyRequest message to the MGW-B containing the IPBCTP Request message as tunnel data received in the APM message.

The MGW-B responds with a ModifyReply message. The MSC-B waits to receive the tunnel data.

The MGW-B sends the NotifyRequest message containing the IPBCTP Accept message with its own IPAddress and PortId as tunnel data.

The MSC-B responds with a NotifyReply confirming the receipt of the tunnel data.

The MSC-B sends the IPBCTP Accept message as tunnel data to the MSC-A in the APM message.

The MSC-A sends a ModifyRequest message to the MGW-A with the tunnel data.

The MGW-A responds with a ModifyReply. At this point in time, both the MGWs are aware of each others IPAddress and PortId.

After the RabAssignment procedures are successful on the MSC-A towards the source RNC, COT message is sent to the MSC-B to indicate that the bearer establishment is successful on the originating side.

The MSC-B after successful bearer establishment on the terminating side, sends the Address Complete Message (ACM) to the MSC-A.

And when the terminating party answers, the MSC-B sends the BICC Answer Message (ANM) message to the MSC-A.

The following is a sample IPBCTP Message:

v=0
o=-0 4727641859017609960 IN IP4 60.20.1.200
s=IPBCP Message
c=IN IP4 60.20.1.200 t=0 0
a=ipbcp:1 Request
m=audio 5098 RTP/AVP 97
a=rtpmap:97 VND.3GPP.IUFP/16000

In the above data, only IP Address (60.20.1.200 in the above example data) and Port Number (5098 in the above example data) fields are of significance for an MGW. Since all other information is redundant, the required information, namely the IP Address and Port Id, can be communicated between MGWs through the BICC Call Control Protocol in the form of BIWF Address and BNCId fields provided by BICC.

All other fields are either unused or have predefined values which are not interpreted by the MGW receiving the IPBCP message.

The following is a sample APM message carrying IPBCTP data:

```
APM -->1f 00 00 00 41 01 78 bb 85 81 c0 00 00 01 82 81 02 07 82 81
    04 08 2b 81 81 22 20 20 76 3d 30 0a 6f 3d 2d 20 30 20 34 30
    36 36 31 31 33 38 34 36 32 38 33 31 31 32 38 36 38 20 49 4e
    20 49 50 34 20 36 30 2e 32 30 2e 31 2e 32 30 30 0a 73 3d 49
    50 42 43 50 20 4d 65 73 73 61 67 65 0a 63 3d 49 4e 20 49 50
    34 20 36 30 2e 32 30 2e 31 2e 32 30 30 0a 74 3d 30 20 30 0a
    61 3d 69 70 62 63 70 3a 31 20 52 65 71 75 65 73 74 0a 6d 3d
    61 75 64 69 6f 20 35 30 38 32 20 52 54 50 2f 41 56 50 20 39
    37 0a 61 3d 72 74 70 6d 61 70 3a 39 37 20 56 4e 44 2e 33 47
    50 50 2e 49 55 46 50 2f 31 36 30 30 30 0a 22 00
```

In the above APM data, the bolded portions indicate an IPBCTP request being tunneled though BICC.

The following are the problems in the existing system:

1. Large and Redundant messages (Extra H.248.1 Notifies and Modifies) exchanged over Mc and Nc Interfaces thereby increasing the processing time at the MGW in terms of encoding and decoding of these messages.

2. Delayed Call Setup.

3. Support for IPBCTP in MSC Server and IPBCP in MGW in order to support IP Bearer.

SUMMARY OF THE INVENTION

The present invention provides a method for the optimization of the BICC procedures for IP Bearer support. The inventive method provides for the exchange of IPAddress and Port Id between two MGWs by:

1. Avoiding tunneling between two MSCs.
2. Reducing the number of message exchanges.
3. Reducing the message sizes.

UMTS Core Networks employ ATM in the transport network user plane, and the transport network control plane with BICC as the call control protocol on the Nb interface. As BICC call control procedures are independent of the bearer technology, BICC can be used over the IP networks.

IP Bearer Control Protocol (IPBCP) is used over IP network environments where BICC is deployed. BICC IPBCP is used for the exchange of media stream characteristics, port numbers and IP addresses of the source and sink of a media stream to establish and allow the modification of IP bearers. The exchange of this information with IPBCP is done during the BICC call establishment and after a call has been established.

The current invention proposes an optimization technique for the exchange of such information over BICC protocol without necessarily using IPBCP.

Accordingly, the present invention relates to IP Bearer Support in a WCDMA system without using IPBCTP and IPBCP protocols wherein only an interpretation of existing procedures is exchanged and not messages and parameters.

Accordingly, the present invention relates to a method for Bearer Independent Call Control (BICC) optimization for IP bearer support wherein a Originating Mobile Switching Centre initiates a bearer establishment procedure by sending a BICC IAM message with the BNC characteristics set to IP/RTP indicating the need of an IP Bearer establishment and codec list indicating the codec negotiation requirement.

A terminating mobile switching center after processing the IAM, performs a prepare bearer procedure by sending an AddRequest message to a terminating media gateway where the AddRequest contains the selected codec for the bearer establishment and the BNC characteristics set to IP/RTP. For the said request, a terminating media gateway responds with an AddReply message that contains the IPAddress which is in the BIWF Address and the PortId which is in the BCNId. The terminating mobile switching center indicates to originating mobile switching center the selected codec for the bearer establishment, the BIWF Address and the BNCId through BICC APM message. The originating mobile switching center performs the prepare bearer procedure by sending the AddRequest message containing the codec type that is used for the bearer establishment, a remote IPAddress and the PortId. The originating media gateway responds with an AddReply with its own IPAddress and PortId. The originating mobile switching center responds to the terminating mobile switching center with an originating media gateway's IPAddress and PortId through the BICC APM message. The terminating mobile switching center sends a ModifyRequest message to the terminating media gateway containing the originating sides IPAddress and PortId.

The terminating media gateway responds with a ModifyReply where, both the MGWs are aware of each other's IPAddress and PortId. After RabAssignment procedures are successful on the originating mobile switching center towards the source RNC, a COT message is sent to the terminating mobile switching centre to indicate that bearer establishment is successful on the originating side. The terminating mobile switching center, after successful bearer establishment on the terminating side, sends the ACM message to the originating mobile switching center. When the terminating party answers, the terminating mobile switching centre sends the BICC ANM message to the originating mobile switching center. The BICC for the IP Bearer support performs the prepare bearer procedure to retrieve the IPAddress and PortId from its associated MGW whenever an AddRequest message is received by the MGW from an MSC server over the Mc interface, and if the procedure type is the prepare bearer and the BNC Characteristics is IP/RTP, the MGW responds with an AddReply message containing its own IPAddress and PortId.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS OF THE INVENTION

The preferred embodiments of the present invention will now be explained with reference to the accompanying drawings. It should be understood however that the disclosed embodiments are merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described in order not to unnecessarily obscure the present invention in detail.

The BICC bearer control tunnelling protocol (Q.1990) assumes a reliable, sequenced, point-to-point signalling transport service between peer tunnelling PDU generating and receiving entities.

Q.1990 supports the tunnelling of Bearer Control Protocols (BCP) over the following protocols:

BICC protocol. BICC tunnelling makes use of BICC APM mechanism, as defined in Q.765.5 (Signalling system No. 7—Application transport mechanism: Bearer Independent Call Control) and Q.1902.4 (Bearer Independent Call Control Protocol—Capability Set 2—Basic Call Procedures); and CBC protocol. CBC tunnelling makes use of the H.248 Tunnelling package, as defined in Q.1950 (Bearer Independent Call Bearer Control Protocol).

Figure 1:
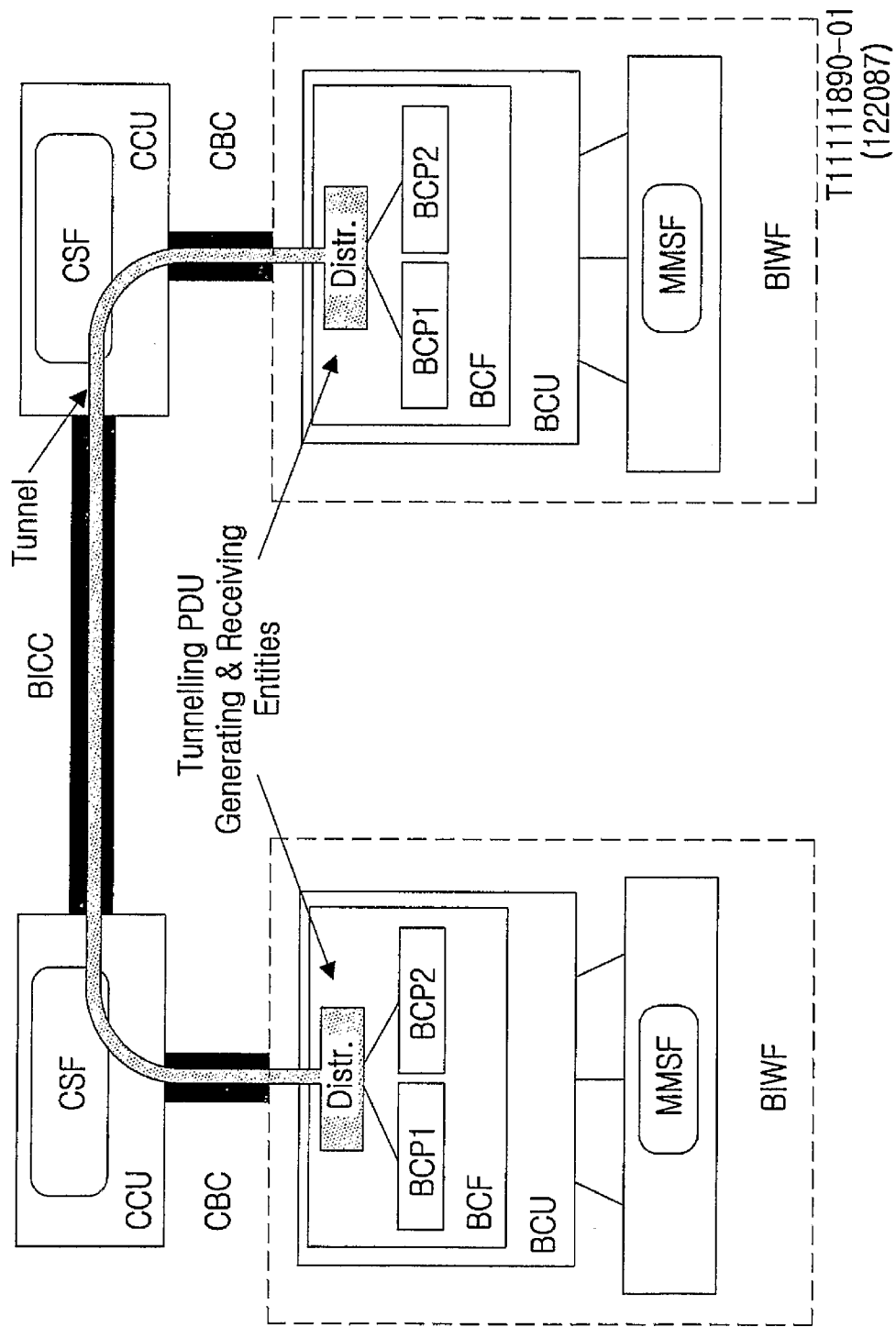
FIG. 1 illustrates the tunneling mechanism.
Figure 2:
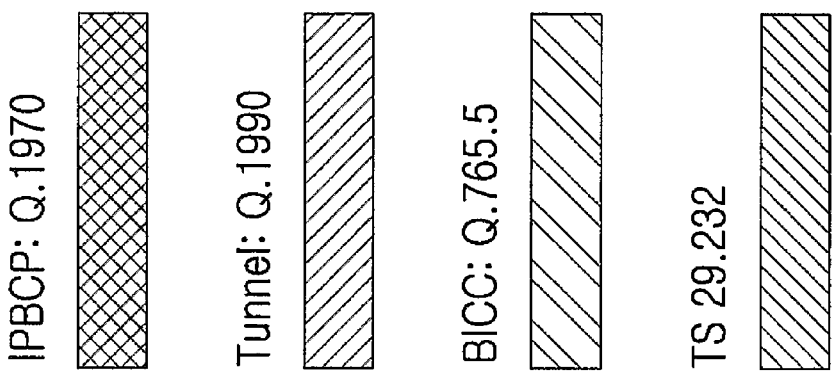
FIG. 2 illustrates IPBCP data being tunneled though BICC messages using IPBCTP protocol.
Figure 2:
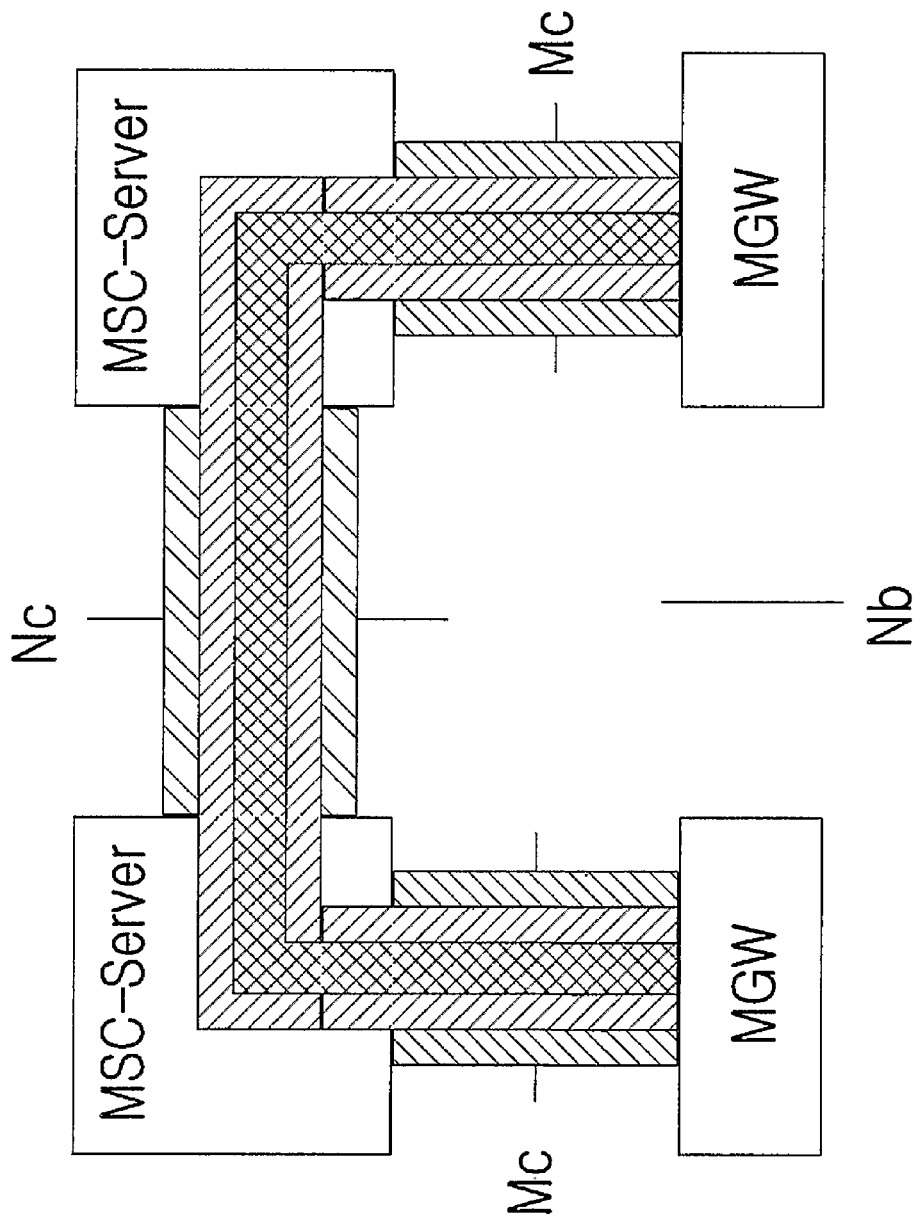

The operation of the tunnelling mechanism is illustrated in FIG. 1 and the transport of IPBCP messages is illustrated in FIG. 2.

To overcome the drawbacks of the IP bearer support that uses IPBCTP and IPBCP, the relevant IP Address and Port Numbers are carried in the BICC's BIWF Address and BNCId protocol fields over the Nc Interface. This helps in overcoming the need for the IPBCTP and IPBCP.

Due to this technique, changes are required to the Megaco (H.248.1) and BICC (Q.1902.4) protocols. These procedures are as follows:

1. The BICC protocol for IP bearer support will always need to perform the prepare bearer procedure as shown in steps 2 and 5 of FIG. 4 in order to retrieve the IPAddress and PortId from its associated MGW. Currently the originating side performs an establish bearer procedure as shown in step 5 in FIG. 3.

2. Whenever an AddRequest message is received by the MGW as in steps 2 and Step 5 in FIG. 4 from an MSC server over the Mc interface, if the procedure type is prepare bearer and the BNC Characteristics is IP/RTP, the MGW should respond with an AddReply message containing its own IPAddress in the BIWF Address and the PortId in the BNCId.

3. On the originating side, the MSC Server sends the remote MGW's IP Address in the BIWF Address and PortId in the BNCId as part of a remote descriptor in the AddRequest message the step 5 of FIG. 4.

4. On the terminating side, the MSC Server needs to send a ModifyRequest message with a remote descriptor containing the originating side's IPAddress in the BIWF Address and PortId in the BNCID in step 8 of FIG. 4.

5. Notify messages of steps 7 and 8 are not required as the IPAddress and PortId are retrieved from the AddReply in step 6 of FIG. 4 itself.

Figure 3:
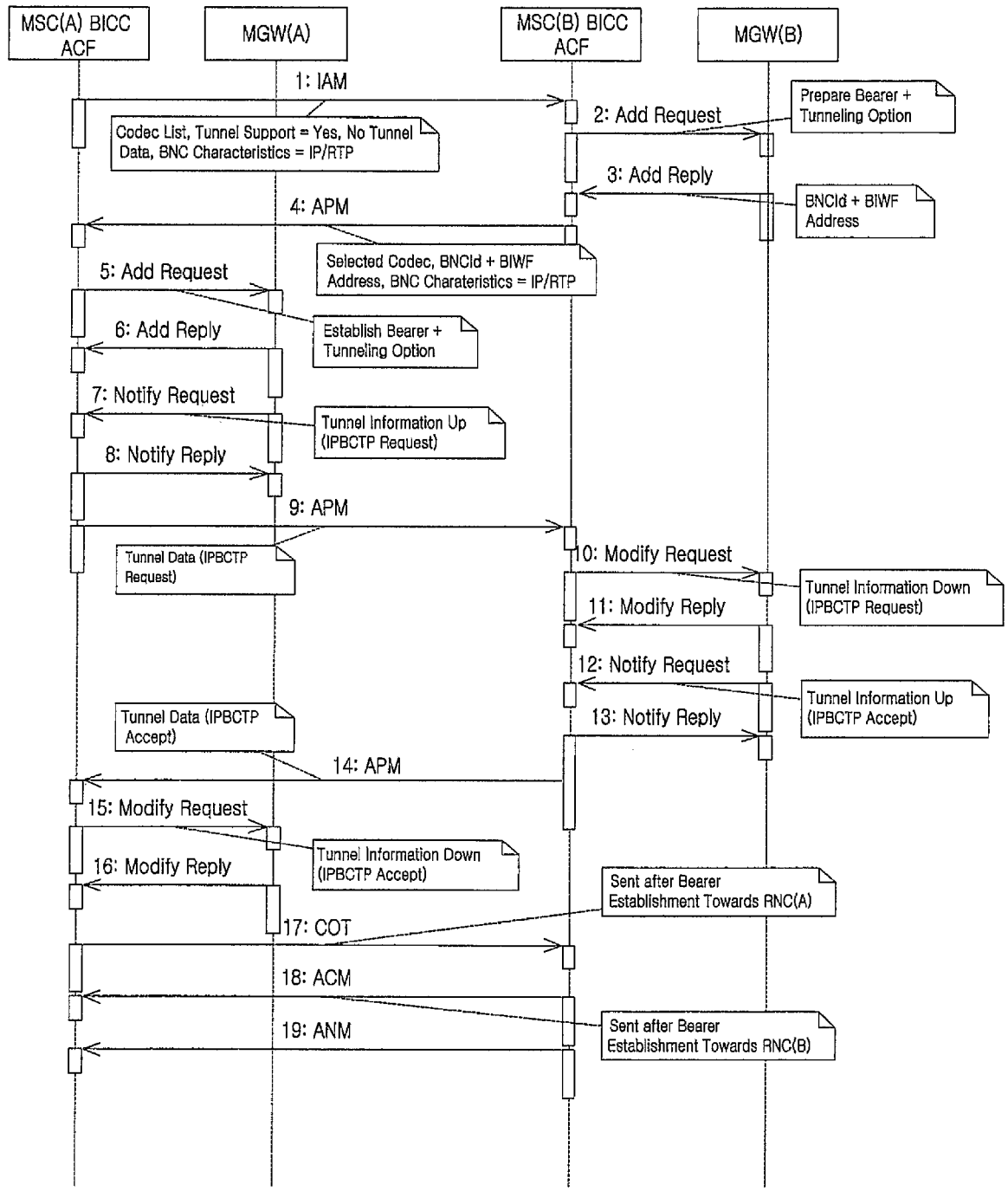
FIG. 3 illustrates existing bearer establishment procedures between two WCDMA R4 systems using s forward bearer delayed tunneling approach that provides for codec negotiation between the systems.

6. The notify messages in steps 12 and 13 of FIG. 3 are not required as the IPAddress and PortId are retrieved in the AddReply in step 3 of FIG. 4.

7. The APM message in step 14 of FIG. 3 is not required since the IPAddress and PortId has already been conveyed in the previous APM message in step 4 in FIG. 4.

8. The Modify Request in Steps 15 and 16 of FIG. 3 are not required since IPAddress and PortId of the peer has already been conveyed as part of the AddRequest message in step 5 in FIG. 4.

From the protocol perspective, when the IP bearer needs to be used, the optional BIWF Address and BNCId needs to be included as mandatory parts of the APM message.

Figure 4:
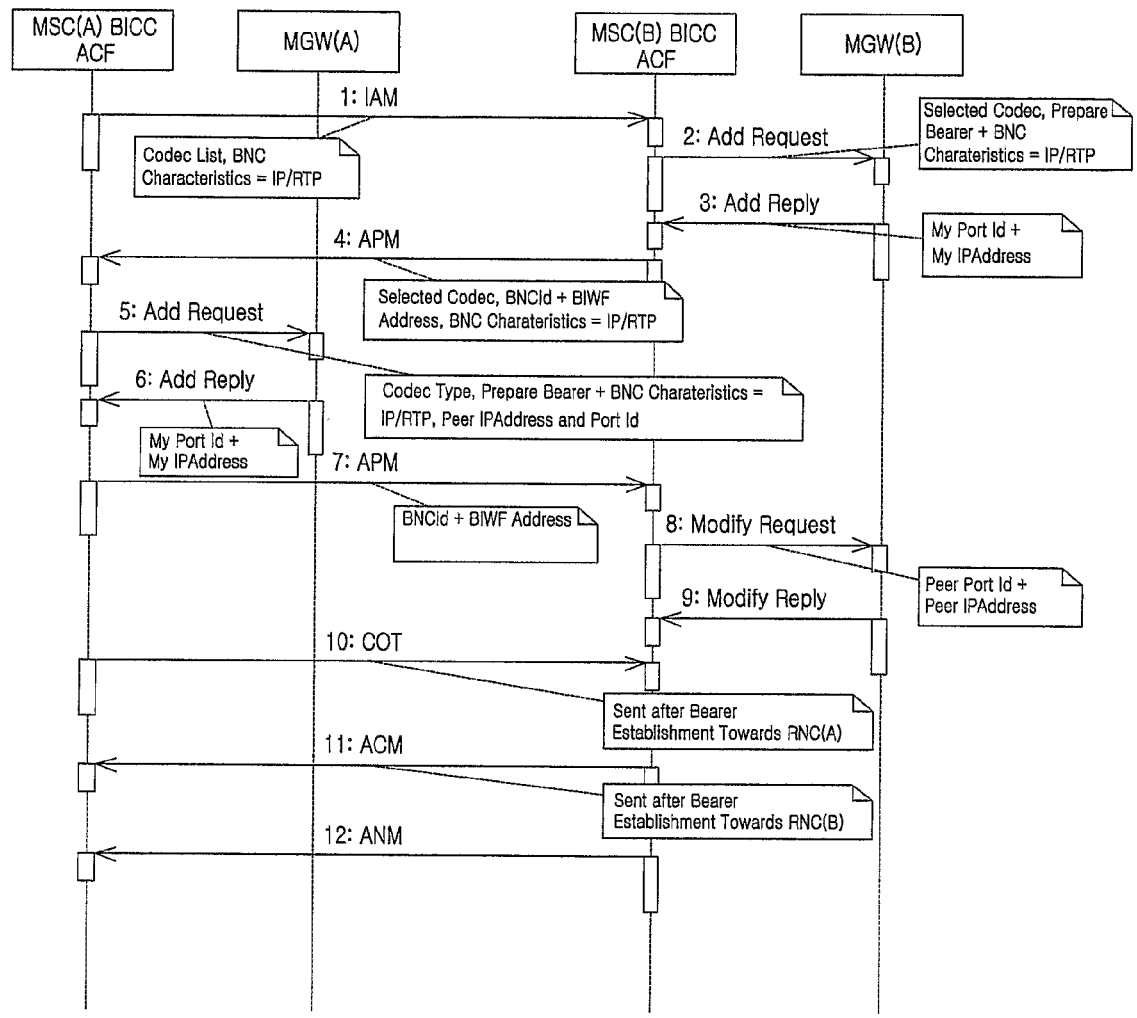
FIG. 4 illustrates the proposed optimized bearer establishment procedures between two WCDMA R4 systems. IPAddress and Port Numbers are communicated using the existing BIWFAddress and BNCId fields respectively, thereby negating the usage of the IPBCTP and IPBCP protocols. The result is reduced interactions between MSC Servers as well as between the MSC Server and the Media Gateway thereby providing a faster call setup.

FIG. 4 illustrates proposed optimized bearer establishment procedures between two WCDMA R4 systems.

1. The MSC-A initiates the bearer establishment procedure by sending a BICC IAM message with the BNC Characteristics set to IP/RTP indicating that the IP bearer needs to be established and the codec list indicating that the codec negotiation is required.

2. The MSC-B after processing the IAM, performs the prepare bearer procedure by sending the AddRequest message to the MGW-B. The AddRequest contains the selected codec for the bearer establishment and BNC Characteristics set to IP/RTP.

3. The MGW-B responds with the AddReply message that contains the IPAddress in BIWF Address and PortId in the BCNId.

4. The MSC-B indicates to the MSC-A the selected codec for the bearer establishment, the BIWF Address and the BNCId through the BICC APM message.

5. The MSC-A now performs the prepare bearer procedure by sending the AddRequest message containing the codec type that needs to be used for bearer establishment, the remote IPAddress and the PortId.

6. The MGW-A responds with the AddReply with its own IPAddress and PortId.

7. The MSC-A now responds to the MSC-B with the MGW-A's IPAddress and PortId through the BICC APM message.

8. The MSC-B sends a ModifyRequest message to the MGW-B containing the originating sides IPAddress and PortId.

9. The MGW-B responds with the ModifyReply. At this point in time, both the MGWs are aware of each other's IPAddress and PortId.

10. After the RabAssignment procedures are successful on the MSC-A towards the source RNC, the COT message is sent to the MSC-B to indicate that the bearer establishment is successful on the originating side.

11. The MSC-B, after successful bearer establishment on the terminating side, sends the ACM message to the MSC-A.

12. And when the terminating party answers, the MSC-B sends the BICC ANM message to the MSC-A.

The following advantages are secured by following the inventive method:

1. The protocols involved (namely Q.1902.x and H.248.1) are not changed in terms of addition or removal of parameters, but only interpretation of existing procedures.
2. Support of the IP bearer by a WCDMA R4 system without using IPBCTP and IPBCP protocols.
3. Faster call setup due to the minimization and optimal usage of the MGW procedures.
4. Processing power is saved due to the absence of IPBCP strings and reduced message interactions. This will result in a higher BHCA in the WCDMA system.
5. Reduced message sizes over the Nc (APM Message in BICC Protocol) and Mc (Add Request and Add Reply Messages in H.248.1) interfaces thereby providing for an effective utilization of the signaling resources.
6. The forward bearer delayed tunneling with codec negotiation that is detailed could be extended for forward bearer and backward bearer establishment procedures with or without codec negotiation between the two systems achieving the same set of advantages as detailed above.

It will also be clear to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but not limited to a microchip, microprocessor, handheld communication device, computer, rendering device or a multi function device.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart therefrom.

What is claimed is:

1. A method for Bearer Independent Call Control (BICC) optimization for Internet Protocol (IP) bearer support, comprising the steps of:
   initiating by an originating Mobile Switching Center (MSC) a bearer establishment procedure by sending a BICC Initial Address Message (IAM) message with a Backbone Network Connection (BNC) characteristics set to IP/Real-time Transport Protocol (RTP) indicating the need for an IP bearer establishment and a codec list indicating a codec negotiation requirement.

2. The method as claimed in claim 1, wherein after processing the IAM, a terminating MSC performs a prepare bearer procedure by sending an AddRequest message to a terminating media gateway, and wherein the AddRequest message contains a selected codec for the IP bearer establishment and the BNC characteristics set to IP/RTP.

3. The method as claimed in claim 2, wherein a terminating media gateway responds to the AddRequest message with an AddReply message that contains an IP address that is included in a Bearer Inter-Working Function (BIWF) Address and a Port Identification (PortId) that is included in a Backbone Network Connection Identification (BNCId).

4. The method as claimed in claim 3, wherein the terminating MSC indicates to an originating MSC the selected codec for the bearer establishment, the BIWF Address and the BNCId through a BICC Application transPort Mechanism (APM) message.

5. The method as claimed in claim 4, wherein the originating MSC performs the prepare bearer procedure by sending the AddRequest message containing the codec type that is used for the bearer establishment, a remote IP address and the PortId.

6. The method as claimed in claim 5, wherein the originating media gateway responds to the AddRequest message with an AddReply message containing its own IP address and PortId.

7. The method as claimed in claim 6, wherein the originating MSC responds to the terminating MSC with an IP address and PortId of an originating media gateway through the BICC APM message.

8. The method as claimed in claim 7, wherein the terminating MSC sends a ModifyRequest message to the terminating media gateway containing the IP address and PortId of the originating media gateway.

9. The method as claimed in claim 8, wherein the terminating media gateway responds with a ModifyReply message, and wherein each of the media gateways have received the IP address and PortId of the other media gateways.

10. The method as claimed in claim 9, wherein after RabAssignment procedures have been successfully performed between the originating MSC and a source Radio Network Controller (RNC), the originating MSC sends a Continuity (COT) message to the terminating MSC to indicate that the bearer establishment is successful on the originating side.

11. The method as claimed in claim 10, wherein the terminating MSC after successful bearer establishment on the terminating side, sends an Address Complete message (ACM) to the originating MSC.

12. The method as claimed in claim 11, wherein when the terminating party answers, the terminating MSC sends a BICC ANswer Message (ANM) message to the originating MSC.

13. The method as claimed in claim 1, wherein the BICC for IP bearer support performs a prepare bearer procedure to retrieve an IP Address and Port Identification (PortId) from an associated media gateway.

14. The method as claimed in claim 1, wherein whenever an AddRequest message is received by a media gateway from a Mobile Switching Center (MSC) Server over an Mc interface, and if a bearer establishment procedure type is a prepare bearer and the BNC characteristics is IP/RTP, the media gateway responds with an AddReply message containing its own IP address and Port Identification (PortId).

* * * * *